June 11, 1963  C. E. LINNIT  3,092,863
WASHING APPARATUS FOR HOLLOW-WARE AND CROCKERY
Filed June 8, 1961  3 Sheets-Sheet 1

INVENTOR
Christopher E. Linnit
Watson, Cole, Grindle & Watson
ATTORNEYS

June 11, 1963  C. E. LINNIT  3,092,863
WASHING APPARATUS FOR HOLLOW-WARE AND CROCKERY
Filed June 8, 1961  3 Sheets-Sheet 3

INVENTOR
Christopher E. Linnit
Watson, Cole, Grindle & Watson
ATTORNEYS

United States Patent Office 3,092,863
Patented June 11, 1963

3,092,863
WASHING APPARATUS FOR HOLLOW-WARE AND CROCKERY
Christopher Edmund Linnit, London, England, assignor to Clenaglass Mechanical Washer Limited, London, England, a British company
Filed June 8, 1961, Ser. No. 115,783
Claims priority, application Great Britain June 8, 1960
4 Claims. (Cl. 15—76)

This invention relates to washing apparatus and in particular for hollow-ware and crockery such as drinking glasses.

According to this invention a washing apparatus comprises a container for washing liquid, a number of brushes in said container arranged to engage the inside and outside of the article to be washed, rotatable shafts carrying said brushes, driving transmission between the shafts and a motor driving one of said shafts through an overload release.

Said overload release may be incorporated in a universal coupling between the said one shaft and a further shaft driven by said motor.

Said universal coupling may be of the kind comprising a flexible disc formed with four holes therein which are engaged by two axially extending pins on a part fixed to said one shaft and two axially extending pins attached to a part fixed to the said further shaft, so that upon overload the flexible disc distorts sufficiently to permit the pins on at least one of said parts to slip out of said holes. The periphery of said flexible disc may be encircled by a rim portion fixed to said part on the one shaft so as to hold the disc on said part.

The motor casing may have secured to it a block formed with a vertically extending hole, a bearing in a fixed part of the apparatus, a vertically extending spindle having an eccentric at one end thereof rotatable in the bearing and which spindle is also rotatable in the hole in the said block, whereby said further shaft may be brought into alignment with said one shaft by rotational adjustment of said spindle and eccentric.

Each of said shafts which carries a brush may extend through a bearing in the bottom wall of the said container each of which bearings at its upper end is cup-shaped, a packing ring disposed within each cup-shaped part, the upper face of each of which packing rings is shaped to define a groove therein and a resilient inner rim portion, each of which grooves accommodates a toroidal spring which presses said rim portion against said shaft, a collar formed in each of said shafts which collar retains said packing ring in said cup-shaped part.

Each of the said bearings may be formed separately from the bottom wall of the container and is provided with an externally threaded reduced portion said bottom wall being shaped to define holes therethrough, through which holes said reduced portions extend, sealing washers disposed between the upper face of said bottom wall and each of the shoulders formed by said reduced portions and the larger portions of said bearings, each of which reduced portions is engaged by a threaded nut, further sealing washers disposed between the under face of said bottom wall and each of said nuts.

Each of said shafts may extend beyond the lower extremity of the reduced portion of its bearing and is formed with a key which engages a keyway in a part of said transmission which drives said shaft, which shaft projects beyond the lower face of the part of the transmission, each of which projections is formed to define a circumferential groove which accommodates a split ring by which axial movement of each of the shafts in its bearing is prevented.

Each of said brushes may comprise a hollow sleeve formed from one of the materials rubber or rubberlike plastics, which sleeve is closed at its upper end and has projecting bristles integral with it and at its lower end is secured to a core, which core is formed with an axially extending bore into which one of the aforesaid shafts extends, which bore is formed with an axially extending groove having a branch portion, which groove is engaged by a lateral projection on its shaft, thereby providing a detachable connection between said core and its shaft, each of which sleeves is formed with at least one hole through which the washing liquid is ejected when the article being washed is pressed against the brush so as to cause it to collapse.

At least a part of the upper face of the bottom wall of the container may be covered by a resilient mat formed from one of the materials rubber or rubber-like plastics.

Means may be provided for introducing treating materials into the washing liquid in the container.

A treating liquid may be introduced into the washing liquid by a pump driven by said motor.

Said driving transmission may include a gear wheel fixed to a central shaft which gear wheel is engaged by a gear wheel on each of the other shafts and in which said motor drives one of the shafts and said pump is driven by another of said shafts.

Said motor may drive said central shaft through gearing and said pump is driven by one of the other shafts.

Said pump may be arranged to deliver said treating liquid from a reservoir to a delivery pipe through which the washing liquid flows into the said container.

A non-return valve may be disposed between said container and reservoir.

For example said non-return valve may be disposed between the outlet of said pump and said delivery pipe.

Said pump may be a vane-type pump the rotatable element of which is connected to one of said shafts.

Said motor may be electric or may drive said shafts through reduction gearing and said container may be provided with a box-like base housing said electric motor, reduction gearing and means for introducing treating liquid.

An inflow and outflow pipe may each pass substantially horizontally through a wall of the box-like base and are provided with a curved portion, which curved portion for at least the out-flow pipe has substantially a large radius of curvature so as to avoid blockage due to solid suspensions in the liquid leaving the container, and which curved portions extend upwardly and each is provided with a coupling, one of which couplings connects the out-flow pipe to the lower end of an overflow pipe which projects through the bottom wall of the container and has its upper end terminating near the top of the container and the other of which couplings connects the in-flow pipe to a short pipe which projects through the bottom wall and terminates substantially flush with the upper face of said wall thus facilitating the cleaning out of the container, and in which said in-flow and out-flow pipes each engage a socket in a part having a collar or the like which lies within a flanged hole formed in the upper face of the bottom wall of the container, and also has a threaded portion which passes through a hole in the bottom wall of the container and is engaged by a clamping nut and the lower extremity of each threaded portion is formed with a space for accommodating packing which encircles the in-flow and out-flow pipe and is retained and compressed by a gland nut.

The following is a more detailed description of one form of washing apparatus according to the invention reference being made to the accompanying drawings in which.

Figure 1:
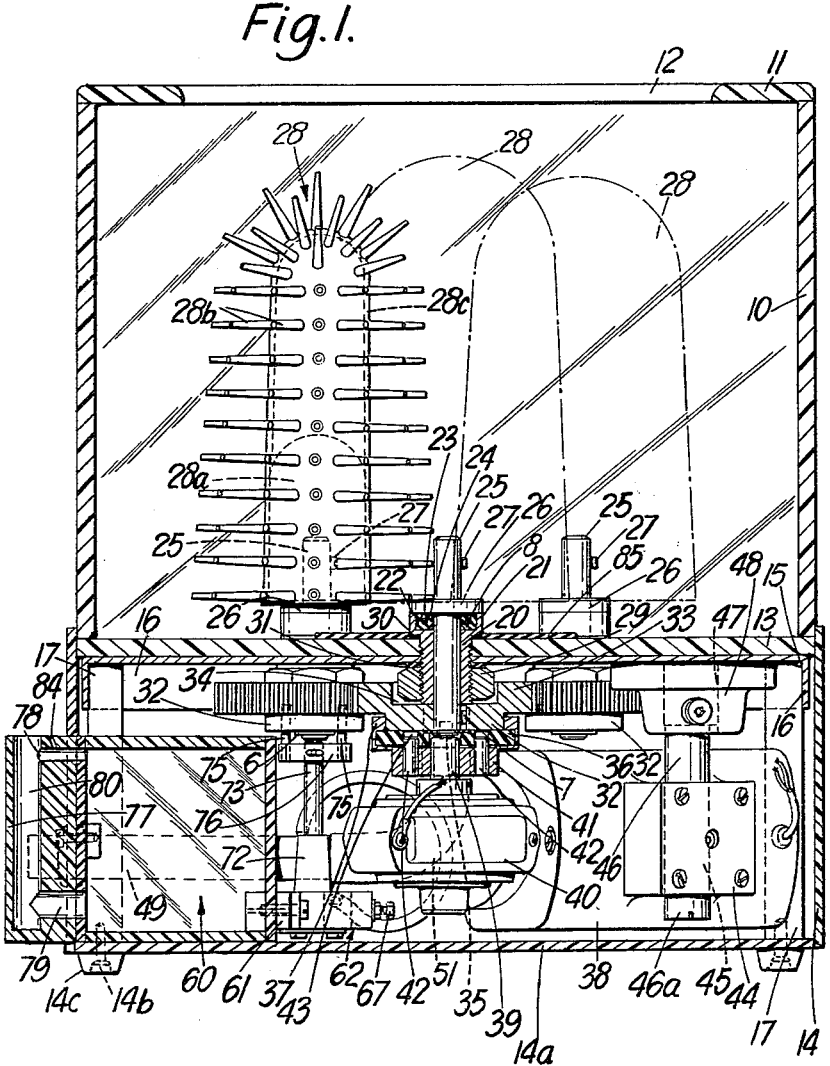
FIGURE 1 is a vertical section of the apparatus.

The container for the washing liquid is rectangular in configuration having four vertical side walls 10, an upper wall 11 having an aperture 12 therein and a bottom wall 13 all of which walls except wall 13 are formed from transparent plastics and bonded together by known technique. The bottom wall 13 is opaque.

Encircling the bottom wall 13 is an opaque box-like base portion 14 also formed from plastics. The underside of the bottom wall 13 is reinforced by a metal plate 15 having a downwardly extending flange 16. Attached to and extending downwardly from the plate 15 are four legs 17 which extend to within a short distance of the bottom of the box-like base 14. A detachable base wall 14a is secured in position by screws 14b extending through rubber feet 14c and engaging screw threaded holes in the legs 17. A centrally disposed hole is formed in the base 13 and supporting plate 15. Four further holes are formed in the base 13 and plate 15 and are disposed at the corners of a square having the centrally disposed hole at its centre.

Extending downwardly through each of the holes is a bearing 20 which has at its upper end an enlarged cup-shaped part 21 which is internally threaded at its upper end in which a rubber packing ring 22 is a tight press fit. The upper face of the packing ring is provided with a groove 23 so shaped to provide a conical portion 24. Extending down through each bearing 20 and packing ring 22 is a spindle 25 provided with a collar 26 which engages the top of the cup-shaped part 21 and retains the packing ring 22 therein. A toroidal spring 8 grips the conical portion 24 and holds it against the spindle 25.

Figure 4:
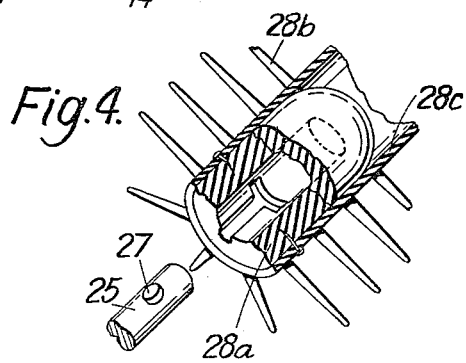
FIGURE 4 is a fragmentary view of part of one rubber brush and its core.

Each of the spindles 25 (see FIGURE 4) is provided with a key in the form of radially extending pin 27 which engages a keyway in a core 28a to which brushes 28 are secured. The brushes are formed from a rubber sleeve 28c closed at its upper end and with its lower end encircling the core, which rubber sleeve has formed integrally therewith rubber bristles 28b and is also provided with a number of comparatively small holes (not shown) whereby water may be drawn into the sleeve and squirted out when the sleeve is compressed.

Each of the spindles 25 extends below the lower end of the bearing 20 which accommodates it and the lower end of the bearing 20 is externally threaded so as to receive a clamping nut 29. Sealing washers 30 and 31 are provided respectively between the inner face of the bottom wall 13 of the container and the shoulder formed by the cup-shaped part 21 and between the underlying plate 15 and the nut 29.

Encircling the projecting end of each spindle 25 is a boss 32 formed on a gear wheel 33, the upper face of the gear wheel being recessed at 34 to receive the aforesaid clamping nut 29. Each spindle 25 is also provided with a key 7 which engages a keyway in the corresponding gear wheel. Each of the gear wheels attached to the non-central shafts meshes only with the gear wheel attached to the central shaft. Each spindle 25 projects below the underface of the boss 32 and is provided with a groove which accommodates a circlip 6 which locates the gear wheel.

Projecting from the underface of the disc-like boss or part 32 on the centre gear wheel are two pins or axial projections 35 which engage holes (not shown) in a flexible resilient disc 36 forming a part of a universal joint referred to later, which disc 36 is itself or by a rim portion 37 secured to the boss 32.

Located within the box-like base 14 is an electric motor 38 which drives a vertical spindle 39 through gearing contained in a gear box 40. The upper end of the spindle 39 has secured to it a rigid disc-like part or collar 41 in which are fixed two axially extending pins or axial projections 42 which extend into two holes 43 formed in the disc 36 which holes lie on a diameter at right angles to the holes for accommodating the pins 35.

In addition to functioning as a universal coupling the flexible disc 36 and its associated parts 32 and 41 with their axial projections or pins 35 and 42 also function as an overload release coupling. When subjected to an overload, the disc 35 will distort sufficiently to release at least one pair of the pins 35—35 or 42—42 to permit relative rotation between the shaft 73 and spindle 25.

The motor 38 has secured to one side thereof a block 44 having therein a vertical hole 45 in which is rotatably mounted a vertical shaft 46 the other end of which is provided with an eccentric 47 rotatable in an adjustable strap or bearing (not shown) in a block 48 fixed to the underface of the plate 15. The lower extremity of the shaft 46 may be provided with a cross-slot 46a which can be engaged with a screwdriver. Thus the motor 38 and the gear box 40 can be adjusted to bring the spindle 39 into axial alignment with the spindle 25 of the central gear by rotating the shaft 46 and by varying the position of the eccentric in the strap or bearing.

Figure 2:
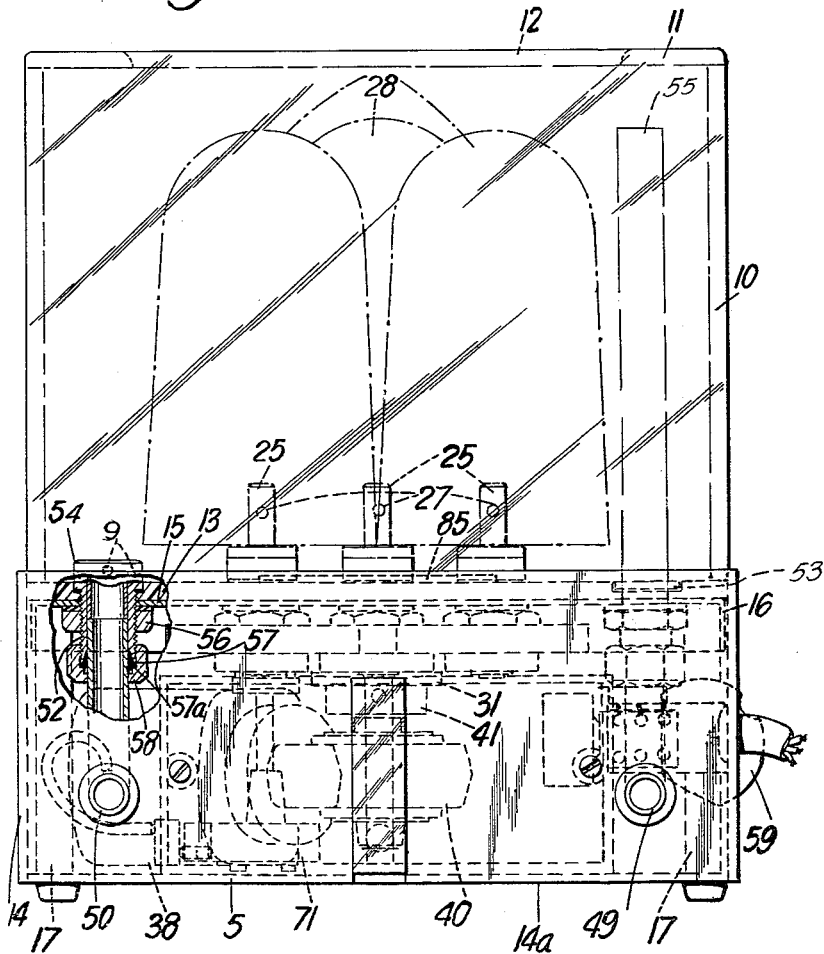
FIGURE 2 is a side elevation of the apparatus with part in section looking from the left of FIGURE 1.

As best seen in FIGURE 2 an in-flow pipe 49 and an out-flow pipe 50 are arranged to extend through a wall of the hollow base portion 14 and to extend upwardly in curved manner as at 51, and each terminate within a socket 52. The curved portion 51 of the out-flow pipe has a substantially large radius of curvature. Each socket is externally threaded and passes through the bottom wall 13 of the container and is provided with an enlarged head 53 (see FIGURE 2) which lies within a flanged hole in the bottom wall 13, a washer being provided between these two parts. A removable overflow pipe 55 extends from the upper part of one socket to a position slightly above the upper part of the rubber sleeves.

The in-flow pipe 49 is closed at its end 54 and projects slightly above the bottom wall 13 and four circumferentially spaced holes 9 are provided in the projecting part 54. The washing liquid flows through these holes into the container.

The external threads of each socket 52 are engaged by a clamping nut 56 and the lower end of each socket is enlarged to provide a space 57 for packing 57a and is engaged by a gland nut 58.

The in-flow and out-flow pipes are each provided at their ends outside the hollow base with clips (not shown) by which they are attached to a pipe made of transparent plastics.

A two-position electric switch 59 (see FIGURE 3) is mounted on a wall of the hollow base part 14 and is provided with means (not shown) for indicating whether it is in the on or off position.

Figure 3:
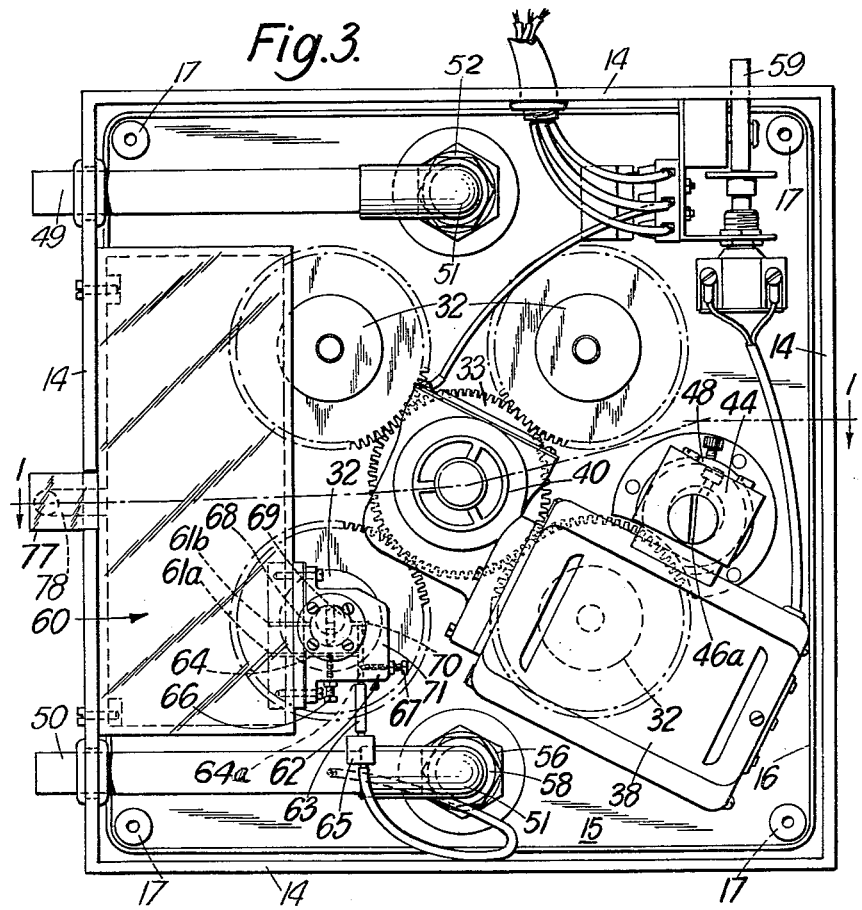
FIGURE 3 is an under-plan of the apparatus with the base wall removed.

Means are provided for supplying a germicide to the washing liquid. Attached to one wall of the hollow base 14 is a reservoir 60 (see FIGURE 3) for the germicide liquid and made of transparent plastics. Extending through one side of the reservoir is a block 61 having two holes 61a, 61b therethrough, as best seen in FIGURE 3. Mounted on the outside of the block 61 is a vane pump indicated generally at 62. The hole 61a leads into a passage 64 in the casing 71 of the vane pump which leads to a passage 64a connected through a non-return valve 65 to the in-flow pipe 50.

The hole 61b leads into a passage 68 in the vane pump casing 71 which passage leads into a cylindrical hole 69 cut through the pump casing. A passage 70 leads from the hole 69 to an outlet not shown.

Screws 66, 67 can be adjusted to restrict the flow of germicide in passages 64, 70 respectively. Formed integrally with and extending outwardly from the casing 71 is a short hollow tube 72 (see FIGURE 1). Rotatable within the hole 69 and tube 72 is a shaft 73 having a head accommodating the vane of the pump. The other end of the shaft 73 is attached to a metal block 76, a split pin passing through the shaft and the block. The block 76 is attached by pins 75 to the boss 32 on one of the non-central gear wheels. Thus the shaft 73 rotates with this gear wheel.

The wall of the base 14 to which the reservoir 60 is attached is slotted and an indicator 77 made of transparent plastics extends through the slot and is attached to the reservoir 60. The indicator is a block having therein two horizontal passages 78, 79 communicating with the interior of the reservoir 60 adjacent two opposed sides thereof and a vertical passage 80 connected at its ends to the horizontal passages. An air vent 84 is also provided. Thus the level of the germicide in the vertical passage 80 indicates the level of germicide in the reservoir 60.

An annular mat 85 made of rubber or rubber-like plastics lies in the container 10 against the upper surface of the bottom wall and surrounds the bearing for the central shaft, which mat prevents damage to the hollow ware should it be pressed down too far.

The container for washing fluid may be part spherical (not shown).

The amount of treating liquid required is comparatively small being of the order of 2½ fluid ounces for 10 gallons of water and assuming that the capacity of the container is about 1¾ gallons and that that amount of water flows through it every quarter of an hour only a few drops of the treating liquid are required to be introduced at a time.

The pump may deliver the treating liquid directly to the container rather than to the in-flow pipe.

Alternatively the treating liquid may be delivered into a passage formed in the shaft of the central brush and terminating in the space within the sleeve so that the treating liquid is injected through the holes in the rubber sleeve.

I claim:

1. A washing apparatus comprising a container for washing liquid, a number of brushes grouped around a central brush in said container arranged to engage the inside and outside of the article to be washed, rotatable spindles carrying said brushes and extending through sealed bearings in the bottom wall of the container into a hollow base, gearing in said base drivingly connecting said spindles, a motor in said base, a shaft driven by said motor, and a resilient universal coupling and an overload release between said shaft and the spindle carrying the central brush, said overload release being incorporated in said universal coupling, the motor casing having secured to it a block formed with a vertically extending hole, a bearing in a fixed part of the apparatus, a vertically extending spindle having an eccentric at one end thereof rotatable in the bearing and which spindle is also rotatable in the hole in the said block whereby said shaft may be brought into alignment with said spindle carrying the central brush by rotational adjustment of said vertical extending spindle and eccentric.

2. A washing apparatus according to claim 1 in which the universal coupling is of the kind comprising a flexible disc formed with four holes therein which are engaged by two axially extending pins on a part fixed to the spindle carrying said central brush and two axially extending pins attached to a part fixed to the said shaft driven by said motor, so that upon overload the flexible disc distorts sufficiently to permit the pins on at least one of said parts to slip out of said holes.

3. A washing apparatus comprising a container for washing liquid, a number of brushes grouped around a central brush in said container arranged to engage the inside and outside of the article to be washed, rotatable spindles carrying said brushes and extending through sealed bearings in the bottom wall of the container into a hollow base, gearing in said base drivingly connecting said spindles, a motor in said base, a shaft driven by said motor, a resilient universal coupling and an overload release between said shaft and the spindle carrying the central brush, said overload release being incorporated in said universal coupling, each of said spindles which carries a brush extending through one of said bearings, each of said bearings at its upper end having a cup-shaped part, a packing ring disposed within each said cup-shaped part, the upper face of each said packing ring being shaped to define a groove therein and a resilient rim portion, a toroidal spring which presses said rim portion against said spindle being disposed in each said groove, a collar formed on each of said spindles which collar retains said packing ring in said cup-shaped part, each of said bearings being formed separately from the bottom wall of the container and being provided with an externally threaded reduced portion, said bottom wall being shaped to define holes therethrough through which holes said reduced portions extend, sealing washers disposed between the upper face of said bottom wall and each of the shoulders formed by said reduced portions and the larger portions of said bearings, each said reduced portion being engaged by a threaded nut, further sealing washers disposed between the under face of said bottom wall and each of said nuts, each of said spindles extending beyond the lower extremity of the reduced portion of its bearing and being formed with a key which engages a keyway in a part of said gearing which drives said spindle, said spindle projecting beyond the lower face of said part of the gearing, and each of said projections being formed to define a circumferential groove, a split ring being disposed in each said groove to prevent axial movement of each said spindle in its bearing.

4. A washing apparatus comprising a container for washing liquid, a number of brushes grouped around a central brush in said container arranged to engage the inside and outside of the article to be washed, rotatable spindles carrying said brushes and extending through sealed bearings in the bottom wall of the container into a hollow base, gearing in said base drivingly connecting said spindles, a motor in said base, a shaft driven by said motor, and a resilient universal coupling and an overload release comprising two rigid parts fixed respectively to said shaft and to the spindle and a resilient part between them, said rigid parts including axial projections interlocking with said resilient part, whereby the distortion of the resilient part under an overload permits release of the said interlock and relative rotation between the spindle and the shaft.

References Cited in the file of this patent

UNITED STATES PATENTS

| | | |
|---|---|---|
| 835,925 | Will | Nov. 13, 1906 |
| 1,583,889 | Lariviere | May 11, 1926 |
| 1,637,376 | Gibney | Aug. 2, 1927 |
| 1,783,349 | Watt | Dec. 2, 1930 |
| 1,837,389 | Albany | Dec. 22, 1931 |
| 2,029,855 | Chambers | Feb. 4, 1936 |
| 2,231,061 | Ebner | Feb. 11, 1941 |
| 2,457,572 | Leonard | Dec. 28, 1948 |

FOREIGN PATENTS

| | | |
|---|---|---|
| 1,224,363 | France | Feb. 8, 1960 |